(12) United States Patent
Tanaka

(10) Patent No.: US 10,211,701 B2
(45) Date of Patent: Feb. 19, 2019

(54) DRIVING APPARATUS AND OPTICAL APPARATUS USING THE SAME

(71) Applicant: CANON KABUSHIKI KAISHA, Tokyo (JP)

(72) Inventor: Yuhei Tanaka, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 199 days.

(21) Appl. No.: 15/013,118

(22) Filed: Feb. 2, 2016

(65) Prior Publication Data

US 2016/0223778 A1 Aug. 4, 2016

(30) Foreign Application Priority Data

Feb. 4, 2015 (JP) ................................. 2015-020174

(51) Int. Cl.
| | | |
|---|---|---|
| G02B 26/02 | (2006.01) | |
| H02K 7/116 | (2006.01) | |
| G02B 5/00 | (2006.01) | |
| G02B 7/10 | (2006.01) | |
| H02K 5/24 | (2006.01) | |

(52) U.S. Cl.
CPC ............. *H02K 7/116* (2013.01); *G02B 5/005* (2013.01); *G02B 7/102* (2013.01); *H02K 5/24* (2013.01)

(58) Field of Classification Search
CPC ..... G02B 27/646; G02B 15/173; G02B 15/14
USPC .................................................. 359/554–557
See application file for complete search history.

(56) References Cited

U.S. PATENT DOCUMENTS

2004/0042090 A1\* 3/2004 Nomura ................. G02B 7/022
359/819

FOREIGN PATENT DOCUMENTS

| JP | H0728141 A | 1/1995 |
|---|---|---|
| JP | H07313371 A | 12/1995 |
| JP | 2006018093 A | 1/2006 |
| JP | 2013105094 A \* | 5/2013 |

OTHER PUBLICATIONS

Office Action issued in Japanese Application No. 2015-020174 dated Nov. 13, 2018.

\* cited by examiner

*Primary Examiner* — William R Alexander
*Assistant Examiner* — Tamara Y Washington
(74) *Attorney, Agent, or Firm* — Rossi, Kimms & McDowell LLP

(57) ABSTRACT

Provided is a driving apparatus including a motor housing supported by an elastic member, which is capable of suppressing tooth skipping due to an unmeshed state of a gear in order to achieve further reduction of vibration and noise. The driving apparatus includes: a driving unit including a motor; an elastic member being in contact with driving unit; a fixing member configured to fix driving unit through intermediation of elastic member; a first gear configured to transmit rotational driving force of motor for driving; a second gear to be meshed with first gear; and a regulating member configured to be spaced apart from a rotary shaft of second gear when the rotary shaft is at a first position, and to come into contact with the rotary shaft when the rotary shaft is at a second position through displacement from first position, to thereby regulate the rotary shaft.

16 Claims, 6 Drawing Sheets

DRIVING APPARATUS AND OPTICAL APPARATUS USING THE SAME

BACKGROUND OF THE INVENTION

Field of the Invention

The present invention relates to a driving apparatus and an optical apparatus using the driving apparatus, and more particularly, to a driving apparatus and an optical apparatus using the driving apparatus, which are suitable for lens drive in an image pickup apparatus.

Description of the Related Art

In general, a driving apparatus is mounted to a lens configured to take moving images for professional use. The driving apparatus is capable of electrically driving a variety of operation of the lens in order to smoothly take a shot at a fixed angle of view or with zooming at ultra-low speed, which is difficult to achieve by manual operation. However, in a case where the lens is electrically driven to perform zooming or focusing while taking the moving images, vibration due to a motor mounted on the driving apparatus as well as resonance with a lens barrel-forming member that may be caused by the vibration and noise resulting from the vibration is recorded.

Therefore, the driving apparatus of the lens is increasingly required to have a structure reduced in vibration and noise. As a structure configured to reduce vibration and noise of the driving apparatus, it is known to interpose an elastic member (damping washer) between a motor housing configured to hold (enclose) a motor and a fixing member configured to fix the motor housing (Japanese Patent Application Laid-Open No. 2013-105094). Vibration and noise of the motor can be thus reduced.

In connection with the above-mentioned related art, the hardness of the elastic member may be reduced to achieve further reduction of vibration and noise of the apparatus. According to this method, however, the motor housing mounted on the driving apparatus is spaced apart from the lens due to force that may be generated at a tooth tip of a gear mounted between the lens and the driving apparatus. The gear between the lens and the driving apparatus is thus separated to be unmeshed, thus resulting in occurrence of a "tooth skipping" phenomenon in which the gear of the motor mounted on the driving apparatus rotates in the unmeshed state. Occurrence of tooth skipping not only causes wear of teeth in the meshing portion but also rotates the gear in the unmeshed state, thus resulting in occurrence of vibration and noise phenomena derived therefrom.

SUMMARY OF THE INVENTION

It is an object of the present invention to provide a driving apparatus including a motor housing supported by an elastic member, which is capable of suppressing tooth skipping due to an unmeshed state of a gear in order to achieve further reduction of vibration and noise, and to provide an optical apparatus using the driving apparatus.

In order to achieve the above-mentioned object, according to one embodiment of the present invention, there is provided a driving apparatus, including: a driving unit including a motor; an elastic member being in contact with the driving unit; a fixing member configured to fix the driving unit through intermediation of the elastic member; a first gear configured to transmit rotational driving force of the motor for driving; a second gear to be meshed with the first gear; and a regulating member configured to be spaced apart from a rotary shaft of the second gear when the rotary shaft is at a first position, and to come into contact with the rotary shaft when the rotary shaft is at a second position through displacement from the first position, to thereby regulate the rotary shaft.

Further, according to one embodiment of the present invention, there is provided an optical apparatus, including the above-mentioned driving apparatus, and an optical member to be driven by the driving apparatus.

Further features of the present invention will become apparent from the following description of exemplary embodiments with reference to the attached drawings.

DESCRIPTION OF THE EMBODIMENTS

Now, exemplary embodiments of the present invention are described in detail with reference to the accompanying drawings.

<<First Embodiment>>
(Optical Apparatus)

Figure 1:
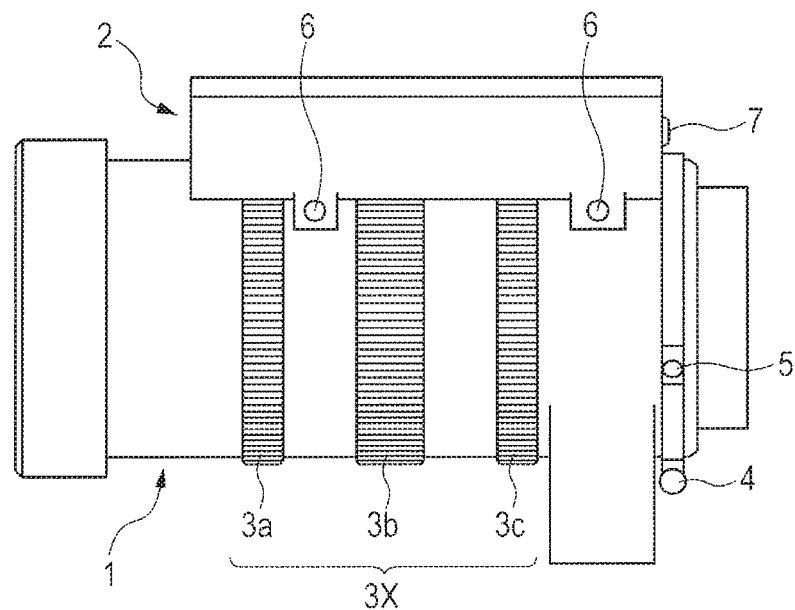
FIG. 1 is a view for illustrating a configuration of a lens barrel serving as an optical apparatus on which a driving apparatus according to an embodiment of the present invention is mounted.

A lens barrel serving as an optical apparatus on which a driving apparatus according to an embodiment of the present invention is mounted is described below with reference to FIG. 1. Referring now to FIG. 1, a lens barrel 1 includes a focus operation ring 3a, a zoom operation ring 3b, an iris operation ring 3c, and a driving apparatus 2 configured to electrically drive those operation rings 3X (3a, 3b, and 3c). Respective driving motors configured to drive the respective operation rings 3X, and position detecting units (not shown)

configured to detect rotational positions of the respective operation rings 3X are arranged inside the driving apparatus 2. Gears are mounted on the respective driving motors and are exposed from the driving apparatus 2 to be engaged with their corresponding operation rings 3X, respectively.

When the focus operation ring 3a is turned, a moving lens unit (focus lenses serving as optical members) (not shown) is moved in the optical axis direction to perform focus adjustment. When the zoom operation ring 3b is turned, a moving lens unit (zoom lenses serving as optical members) (not shown) is moved in the optical axis direction to perform zoom adjustment. When the iris operation ring 3c is turned, an iris (stop) serving as an optical member changes the aperture diameter of the stop to perform light intensity adjustment.

The driving apparatus 2 is fixed to the lens barrel 1 by threadingly engaging screws (not shown) into fastening portions 6. An operation unit 7 including various types of switches is arranged on an external portion of the driving apparatus 2. The operation unit 7 is operated to drive the internal motors so that the operation rings 3X can be driven to rotate. Further, the lens barrel 1 includes a flange back (hereinafter abbreviated as "F.B.") operation ring 4 and a macro operation ring 5. When the F.B. operation ring 4 or the macro operation ring 5 is turned, a moving lens unit (not shown) is moved in the optical axis direction to adjust the in-focus distance to an image pickup element.

(Internal Configuration of Driving Apparatus)

Figure 2:
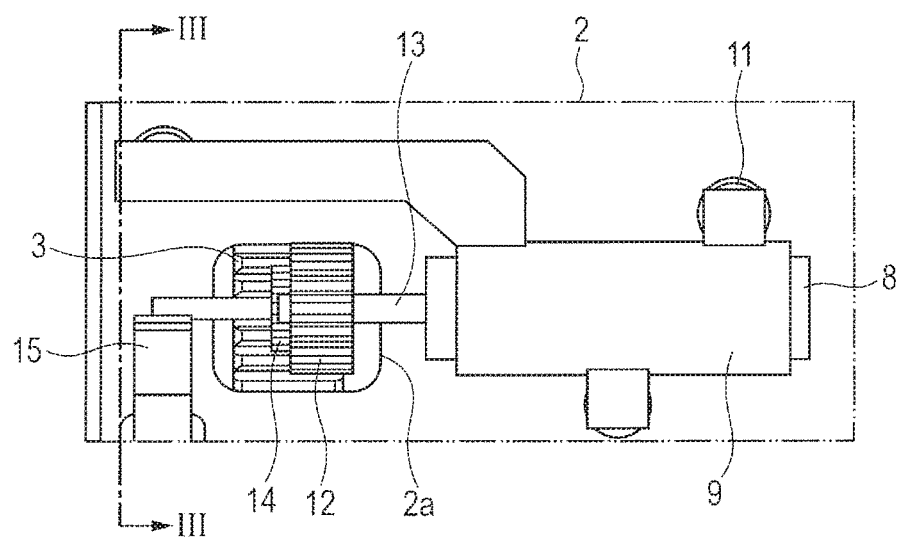
FIG. 2 is a detailed view of a tooth skipping-preventing structure according to a first embodiment of the present invention.
Figure 3:
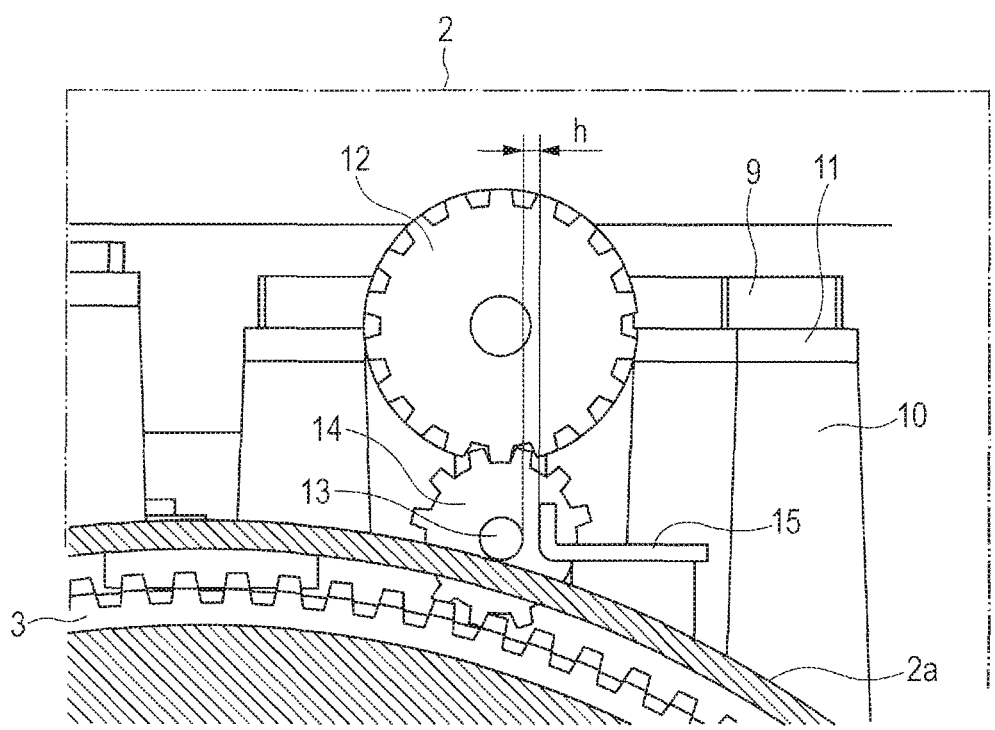
FIG. 3 is a cross-sectional view of the tooth skipping-preventing structure according to the first embodiment of the present invention taken along the line III-III in FIG. 2.

Next, an internal configuration of the driving apparatus 2 is described with reference to FIG. 2 and FIG. 3. A motor housing 9 (driving unit) configured to hold (enclose) a driving motor 8 configured to generate rotational driving force and rotatable in both forward and reverse directions is fixed to a fixing member 10 mounted on an apparatus housing 2a of the driving apparatus 2 with screws (not shown). An elastic member 11 is interposed between the motor housing 9 and the fixing member 10 so as to be in contact with the motor housing 9.

A driving gear 12 that is a first gear capable of transmitting the rotational driving force for driving is mounted on the driving motor 8. Further, a driven gear 14 that is a second gear is mounted on a driven gear shaft 13 that is a rotary shaft integrally supported by the motor housing 9. The driving gear 12 and the driven gear 14 are meshed and engaged with each other, and the driven gear 14 and a gear 3 of the operation ring 3X serving as an output gear (third gear) are also meshed and engaged with each other.

Among at least one gear serving as driven gears to be meshed with the driving gear 12, a gear having the rotary shaft 13 integrally supported by the motor housing 9 is used as the driven gear 14 that is the second gear. The driven gear 14 is any one of the at least one gear to be meshed with the driving gear 12 and has the rotary shaft 13 integrally supported by the motor housing 9. According to this embodiment, the driven gear 14 having the rotary shaft 13 integrally supported by the motor housing 9 is one of the at least one gear to be meshed with the driving gear 12 and is farthest from the driving gear 12 (the number of driven gears in FIG. 3 is one).

Such a gear configuration allows the rotational driving force of the driving motor 8 to be transmitted to the gear 3 serving as the output gear and arranged on the operation ring 3X. The gear 3 outputs the rotational driving force of the motor for movement in a predetermined direction.

(Tooth Skipping-Preventing Structure)

Next, a configuration of a tooth skipping-preventing structure arranged in the driving apparatus 2 is described with reference to FIG. 2, FIG. 3, FIG. 4A, and FIG. 4B. The rotary shaft 13 integrally supported by the motor housing 9 has one end supported by the motor housing 9 and the other end arranged with a degree of freedom, and causes displacement (positional displacement) due to reaction force from the gear 3 serving as the output gear and is turned so that the other end draws a circumferential trajectory.

A tooth skipping-preventing member 15 serving as a regulating member is fixed to the apparatus housing 2a with screws (not shown) so that a predetermined position on the circumferential trajectory becomes a position of contact. According to this embodiment, the position of contact between the other end (free end) of the rotary shaft 13 and the tooth skipping-preventing member 15 is located in a direction (orthogonal direction) that intersects with a direction connecting the driving gear 12 with the driven gear 14 with respect to the rotary shaft 13 located at a first position (normal state having no displacement).

The tooth skipping-preventing member 15 is spaced apart from the rotary shaft 13 when the rotary shaft 13 is at the first position (normal state having no displacement), and comes into contact with the rotary shaft for regulation when the rotary shaft 13 is at a second position (position through displacement from the first position). When the rotary shaft 13 is at the first position (normal state having no displacement), a distance (space) h between the tooth skipping-preventing member 15 and the rotary shaft 13 is twice or less as large as the module of the driven gear 14. The module as used herein refers to a value obtained by dividing the reference circle diameter of a gear (diameter of a circle when mutually meshing gears are in contact with each other) by the number of teeth.

In a case of a driving motor rotatable in both forward and reverse directions, displacement (direction C1) of the rotary shaft 13 in one rotational direction (direction B1) can be regulated with the tooth skipping-preventing member 15, while displacement (direction C2) of the rotary shaft 13 in the other rotational direction (direction B2) can be regulated with the gear 3 serving as the output gear.

(Effects of Tooth Skipping-Preventing Structure)

Figure 4A:
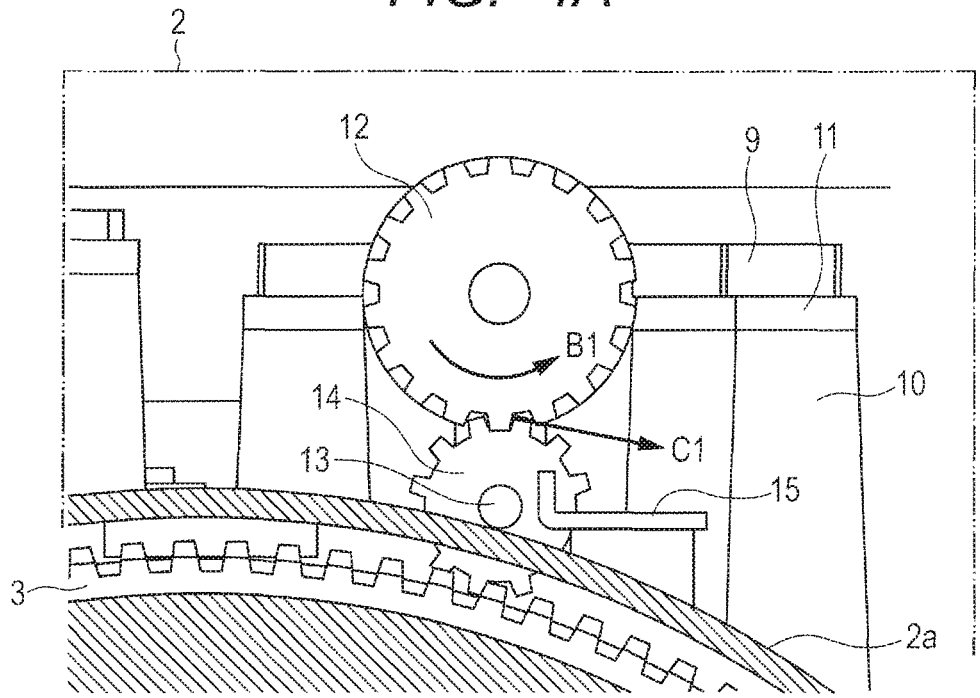
FIG. 4A is a view for illustrating a force relationship of the driving apparatus during driving of a driving gear according to the first embodiment of the present invention.
Figure 4B:
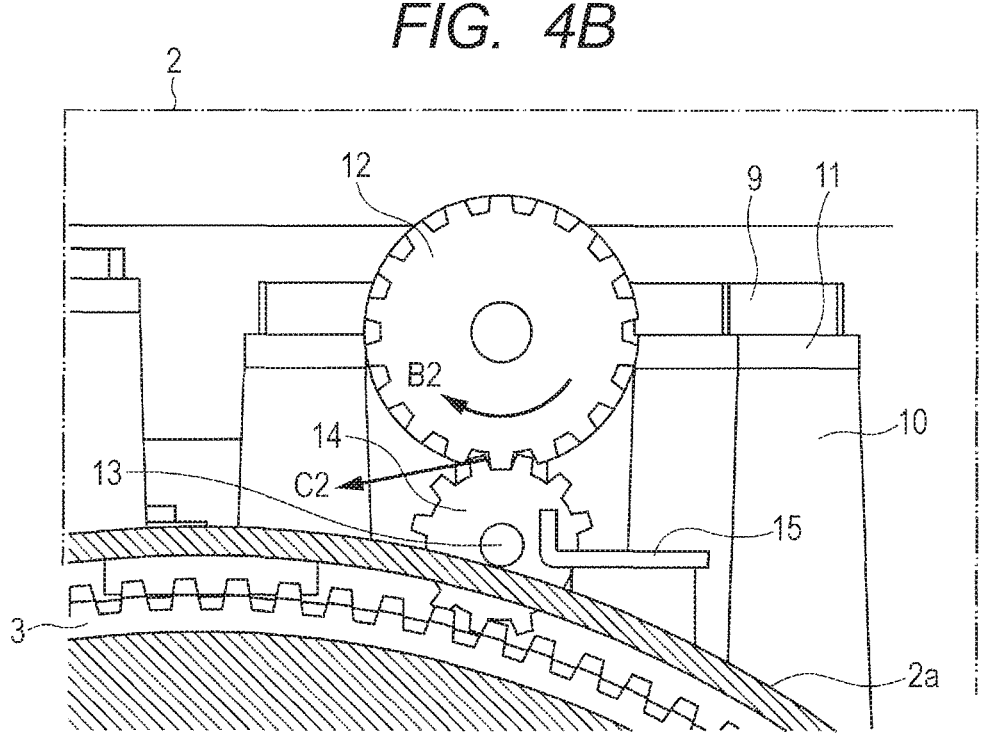
FIG. 4B is a view for illustrating a force relationship of the driving apparatus during driving of the driving gear according to the first embodiment of the present invention.

Next, the effects obtained by arranging the tooth skipping-preventing structure are described with reference to FIG. 4A and FIG. 4B. The hardness of the elastic member 11 configured to support the motor housing 9 is generally reduced to suppress vibration that may derive from the driving motor 8. On the other hand, the elastic member 11 is liable to cause elastic deformation through reduction of its hardness.

When the driving gear 12 that has gained the rotational driving force from the driving motor 8 rotates in the direction B1 in this state, the driven gear 14 is subjected to force C1 in a pressure angle direction to cause deformation of the elastic member 11. Thus, the driven gear shaft 13 mounted on the motor housing 9 causes relative positional displacement in the direction C1 with respect to the fixing member 10, and the driven gear 14 is unmeshed from the operation ring 3X to cause rotation of the driven gear 14 in the unmeshed state. As a result, tooth skipping is liable to occur.

However, the tooth skipping-preventing member 15 is arranged, and hence the relative positional displacement of the driven gear shaft 13 in the direction C1 is regulated. Therefore, the state in which the driven gear 14 is meshed with the operation ring 3X is maintained, and as a result, tooth skipping does not occur.

Next, the effects obtained by arranging the tooth skipping-preventing member 15 with the space h secured therefrom are described. In general, when the motor housing 9 is to be fixed, the driven gear shaft 13 mounted on the motor housing 9 may be supported by a bearing that is integral with the apparatus housing 2a. However, in a structure using such a bearing, vibration derived from the driving motor 8 may propagate through the driven gear shaft and the bearing to cause resonance with the apparatus housing 2a and noise resulting from the vibration. On the other hand, according to the structure of this embodiment, the tooth skipping-preventing member 15 is arranged with the space h secured therefrom to prevent the tooth skipping-preventing member 15 from being in contact with the driven gear shaft 13 at all times, and hence noise due to resonance does not occur, thus improving the quality of the driving apparatus.

<<Second Embodiment>>

Figure 5A:
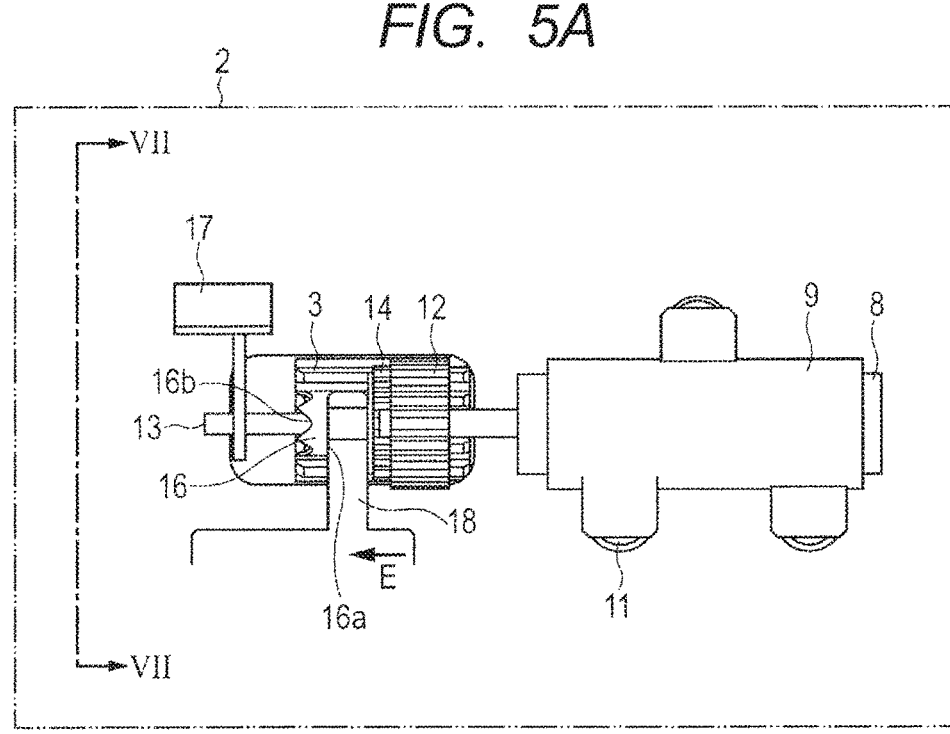
FIG. 5A is a view for illustrating a tooth skipping-preventing structure (servo state) including a brake mechanism according to a second embodiment of the present invention.
Figure 5B:
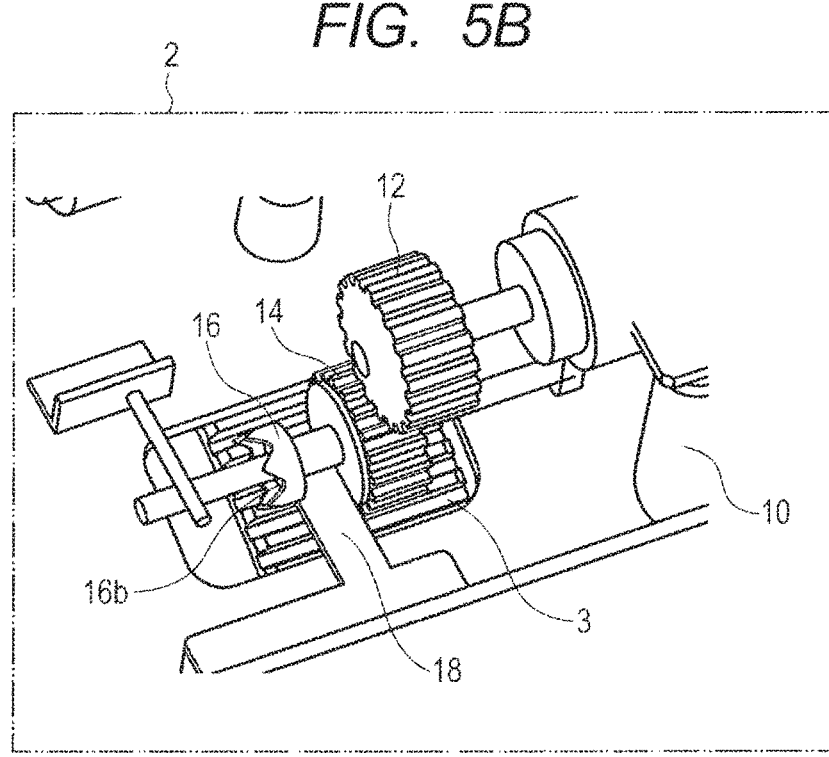
FIG. 5B is a view for illustrating the tooth skipping-preventing structure (servo state) including the brake mechanism according to the second embodiment of the present invention.
Figure 6A:
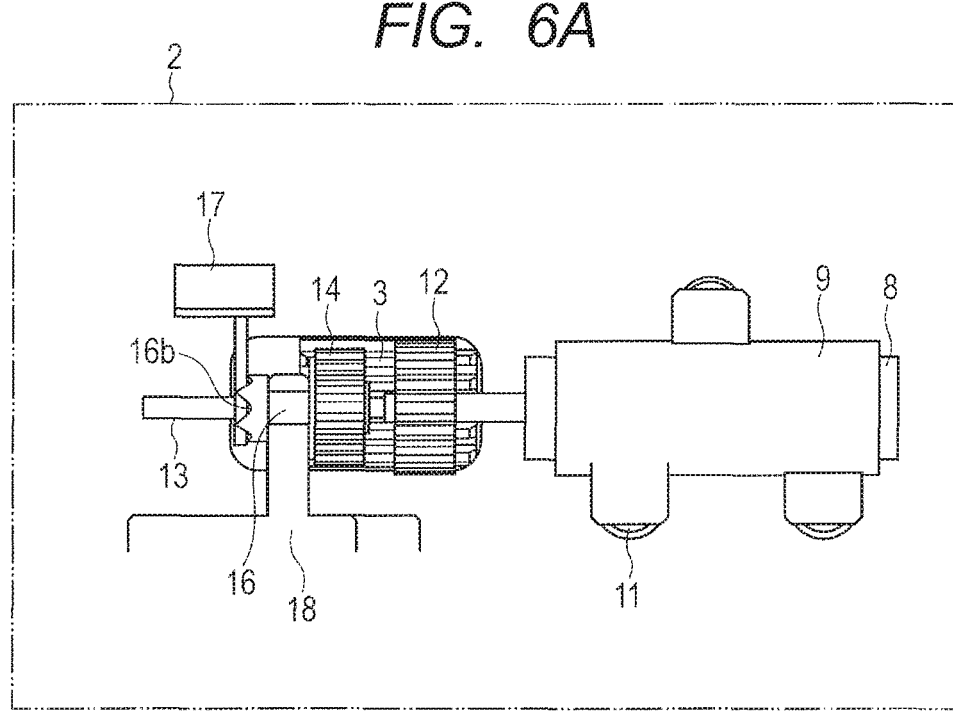
FIG. 6A is a view for illustrating the tooth skipping-preventing structure (manual operation state) including the brake mechanism according to the second embodiment of the present invention.
Figure 6B:
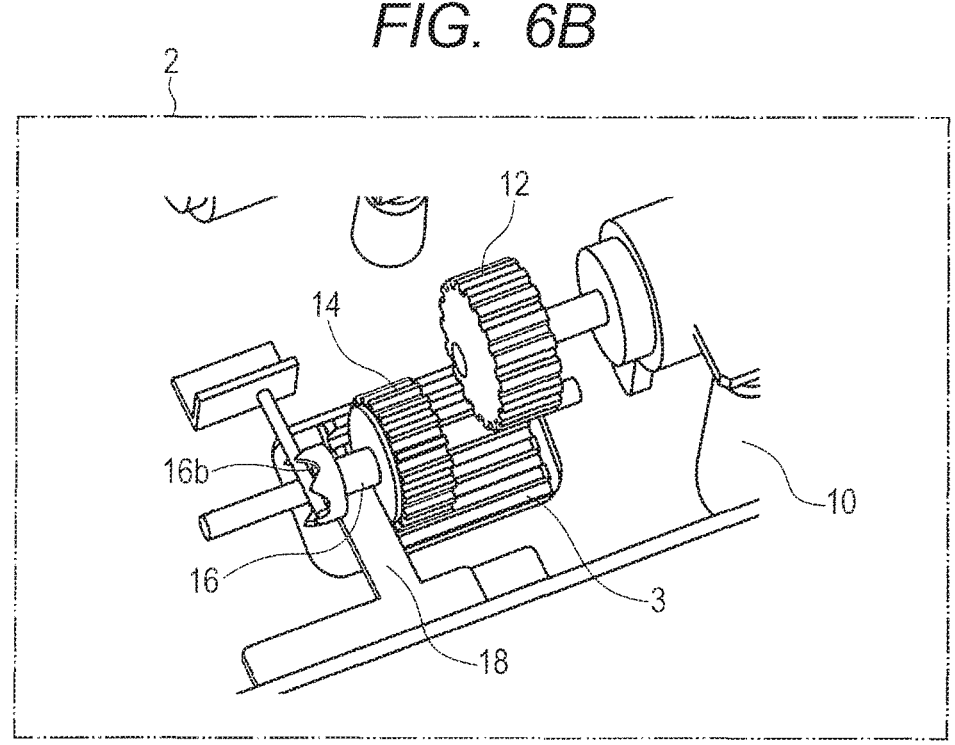
FIG. 6B is a view for illustrating the tooth skipping-preventing structure (manual operation state) including the brake mechanism according to the second embodiment of the present invention.
Figure 7:
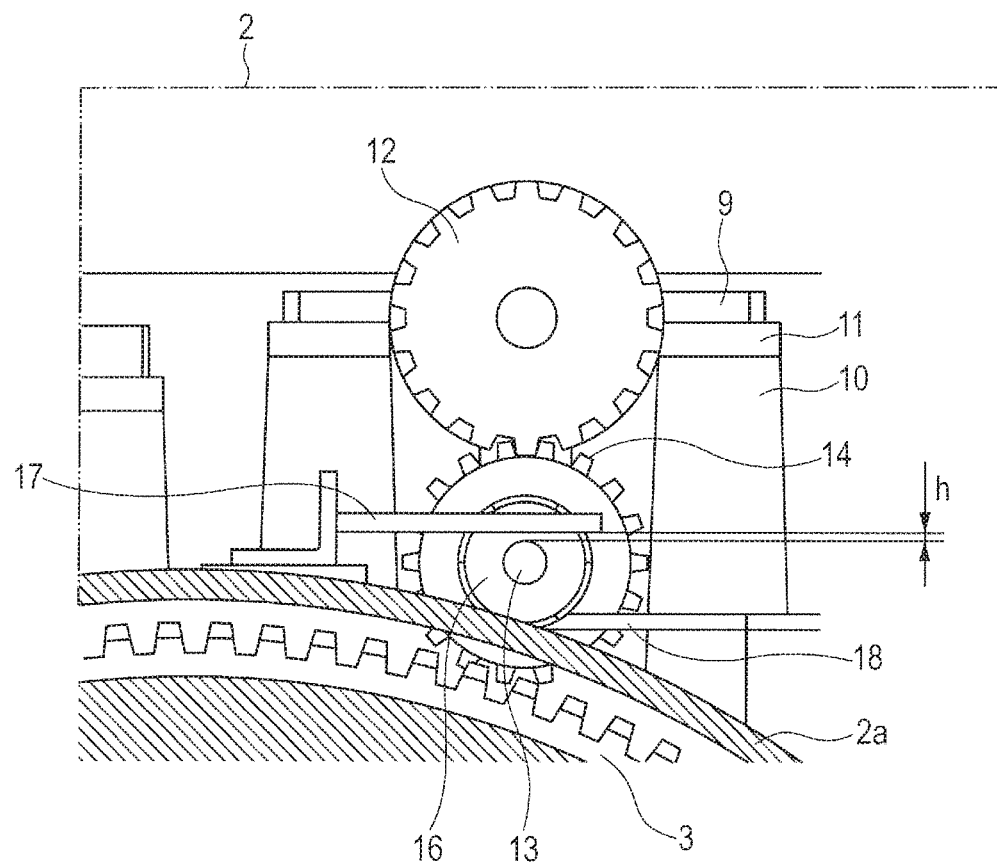
FIG. 7 is a cross-sectional view of the tooth skipping-preventing structure according to the second embodiment of the present invention taken along the line VII-VII in FIG. 5A.

FIG. 5A and FIG. 5B are views for illustrating a tooth skipping-preventing structure including a brake mechanism according to a second embodiment of the present invention (servo state). FIG. 6A and FIG. 6B are views for illustrating the tooth skipping-preventing structure including the brake mechanism according to this embodiment (manual operation state). FIG. 7 is a cross-sectional view of the tooth skipping-preventing structure according to this embodiment taken along the line VII-VII (FIG. 5A). An internal configuration of the driving apparatus 2 and a configuration of the tooth skipping-preventing structure arranged in the driving apparatus 2 are described with reference to FIG. 5A, FIG. 5B, FIG. 6A, FIG. 6B, and FIG. 7.

As described in the first embodiment, the rotary shaft 13 integrally supported by the motor housing 9 has one end supported by the motor housing 9 and the other end arranged with a degree of freedom, and causes displacement (positional displacement) due to reaction force from the gear 3 serving as the output gear and is turned so that the other end draws a circumferential trajectory. A tooth skipping-preventing member 17 serving as a regulating member is fixed to the apparatus housing 2a with screws (not shown) so that a predetermined position on the circumferential trajectory becomes a position of contact.

According to the first embodiment, the position of contact between the other end (free end) of the rotary shaft 13 and the tooth skipping-preventing member 15 is located in the direction (orthogonal direction) that intersects with the direction connecting the driving gear 12 with the driven gear 14 with respect to the rotary shaft 13 located at the first position (normal state having no displacement). In contrast, according to this embodiment, the position of contact is located in a direction connecting the driving gear 12 with the driven gear 14. In other words, the tooth skipping-preventing member 17 in FIG. 7 is arranged so that the position of contact with the displaced rotary shaft 13 is located in the direction connecting the driving gear 12 with the driven gear 14.

(Clutch Mechanism and Brake Mechanism)

In contrast to the first embodiment, this embodiment includes a clutch mechanism that can move a movable plate 18 capable of meshing the driving gear 12 with the driven gear 14 to transmit the rotational driving force of the driving motor 8 to the operation ring 3X, or of unmeshing the driving gear 12 from the driven gear 14 to block the rotational driving force. Further, a brake mechanism 16 configured to generate rotational friction at the driven gear 14 in an opposite direction to that of the input torque is formed.

In other words, the driving apparatus 2 includes a clutch mechanism (not shown) operable from outside, and a user operates the clutch mechanism (not shown) so that the movable plate 18 becomes movable in a direction E (FIG. 5A). The movable plate 18 is thus pressed against a side surface 16a of the brake mechanism 16 configured integrally with the driven gear 12 as illustrated in FIG. 5A to unmesh the driven gear 14 from the driving gear 12 as illustrated in FIG. 6B.

As a result, the tooth skipping-preventing member arranged with the space h secured therefrom as illustrated in FIG. 7 comes into engagement with a latching portion 16b provided to the brake mechanism 16. The tooth skipping-preventing member 17 thus locks the latching portion 16b provided to the brake mechanism 16 so that the degree of freedom of the brake mechanism 16 about the driven gear shaft 13 is regulated.

In a case where the user operates the operation ring 3X for rotation in this state from outside, the brake mechanism 16 can generate rotational friction in an opposite direction to that of the input torque transmitted to the driven gear 12. Therefore, also in the manual operation state illustrated in FIG. 6A and FIG. 6B, rotational friction due to the brake mechanism 16 occurs, and hence the operation ring 3X has increased torque and is turned with improved ease.

According to this embodiment having the above-mentioned configuration, in addition to the effects obtained in the first embodiment, the tooth skipping-preventing structure can also serve as the brake mechanism with a smaller number of components, and hence the structure is advantageous in terms of ease of assembling. In addition, space saving can be achieved.

(Modified Examples)

The exemplary embodiments of the present invention are described above, but the present invention is not limited to those embodiments and can be modified and changed variously within the scope of the gist thereof.

(First Modified Example)

Plate-like and rod-like tooth skipping-preventing members are applied to the driven gear shaft according to the above-mentioned embodiments. However, an annular tooth skipping-preventing member configured to enclose the driven gear shaft therein with the space h secured therefrom may be applied.

(Second Modified Example)

The tooth skipping-preventing member is also used as the brake mechanism of the clutch mechanism according to the second embodiment. However, a component configured to regulate the rotation of the brake mechanism may be separately arranged for the clutch mechanism.

(Third Modified Example)

The driving motor is not limited to the type rotatable in both forward and reverse directions, but may be rotatable in one direction.

According to the present invention, it is possible to provide the driving apparatus including the motor housing supported by the elastic member, which is capable of suppressing the tooth skipping due to the unmeshed state of the gear in order to achieve further reduction of vibration and noise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-020174, filed Feb. 4, 2015, which is hereby incorporated by reference herein in its entirety.

What is claimed is:

1. A driving apparatus comprising:
a driving unit comprising a motor;

an elastic member being in contact with the driving unit;
a fixing member configured to fix the driving unit through intermediation of the elastic member;
a first gear configured to transmit rotational driving force of the motor;
a second gear to be meshed with the first gear;
a rotary shaft holding the second gear; and
a regulating member configured to:
- be spaced apart from the rotary shaft in a state where the rotary shaft is at a first position; and
- come into contact with the rotary shaft in a state where the rotary shaft is at a second position displaced from the first position through deformation of the elastic member to regulate displacement of the rotary shaft.

2. The driving apparatus according to claim 1, wherein the rotary shaft is supported by the driving unit.

3. The driving apparatus according to claim 1, wherein the regulating member is spaced apart from the rotary shaft at the first position by an amount not larger than twice as large as a module of the second gear.

4. The driving apparatus according to claim 1, wherein the second gear is farthest from the first gear among at least one gear to be meshed with the first gear.

5. The driving apparatus according to claim 4, further comprising:
a third gear configured to output the rotational driving force of the motor through meshing with the second gear,
wherein the regulating member is configured to regulate the displacement of the rotary shaft due to reaction force from the third gear.

6. The driving apparatus according to claim 5, wherein the third gear is arranged on an operation ring operable by a user.

7. The driving apparatus according to claim 5, wherein:
the motor is rotatable in both forward and reverse directions,
the displacement of the rotary shaft in one of the forward or reverse direction is regulated with the regulating member, and
the displacement of the rotary shaft in the other of the forward or reverse direction is regulated with the third gear.

8. The driving apparatus according to claim 5, further comprising a clutch mechanism configured to perform one of causing the first gear to mesh with the second gear to transmit the rotational driving force of the motor to the third gear, or causing the first gear to not mesh with the second gear to not transmit the rotational driving force of the motor to the third gear.

9. The driving apparatus according to claim 8, wherein, in a state where the first gear is caused to not mesh with the second gear by the clutch mechanism, the regulating member is configured to generate rotational friction to the second gear to form a brake mechanism thereof.

10. The driving apparatus according to claim 1, wherein the rotary shaft has one end supported by the driving unit and another end arranged with a degree of freedom.

11. The driving apparatus according to claim 10, wherein a position of contact between the rotary shaft and the regulating member is on a circumferential trajectory of the another end.

12. The driving apparatus according to claim 11, further comprising:
another shaft holding the first gear,
wherein the contact occurs at a position of the rotary shaft shifted from the first position in a direction intersecting with a direction connecting the rotary shaft and the another rotary shaft.

13. The driving apparatus according to claim 11, further comprising:
another rotary shaft holding the first gear,
wherein the contact occurs at a position of the rotary shaft shifted from the first position in a direction connecting the rotary shaft and the another rotary shaft.

14. The driving apparatus according to claim 1, wherein the regulating member is fixed to a housing of the driving apparatus.

15. An optical apparatus comprising:
a driving apparatus; and
an optical member to be driven by the driving apparatus, the driving apparatus comprising:
a driving unit comprising a motor;
an elastic member being in contact with the driving unit;
a fixing member configured to fix the driving unit through intermediation of the elastic member;
a first gear configured to transmit rotational driving force of the motor;
a second gear to be meshed with the first gear;
a rotary shaft holding the second gear; and
a regulating member configured to:
- be spaced apart from the rotary shaft in a state where the rotary shaft is at a first position; and
- come into contact with the rotary shaft in a state where the rotary shaft is at a second position displaced from the first position through deformation of the elastic member to regulate displacement of the rotary shaft.

16. The optical apparatus according to claim 15, wherein the optical member comprises a lens for zoom adjustment, a lens for focus adjustment, or an iris, or any combination thereof.

* * * * *